United States Patent Office

3,488,299
Patented Jan. 6, 1970

3,488,299
METHOD OF PREPARING A SYNTHETIC RESIN FOAM
Unzo Sato, 6248, Fujisawa, Fujisawa-shi,
Kanagawa-ken, Japan
No Drawing. Filed Dec. 5, 1967, Ser. No. 688,002
Claims priority, application Japan, Feb. 27, 1967,
42/12,184
Int. Cl. C08f 47/10
U.S. Cl. 260—2.5     5 Claims

ABSTRACT OF THE DISCLOSURE

Monosodium citrate, prepared by mixing citric acid and trisodium citrate in a mole ratio of 1:2 is stable between 160° and 210° C., the melting range of polystyrene and of many copolymers containing styrene as the principal ingredient. It also reacts much more slowly than citric acid with sodium bicarbonate and other bicarbonates and carbonates at less than 160° C. When mixed with such carbonates and bicarbonates, monosodium citrate is an effective cell size control agent in the preparation of polystyrene and styrene copolymer foams with low-boiling hydrocarbons as foaming agents.

BACKGROUND OF THE INVENTION

This invention relates to the manufacture of foamed homopolymers and copolymers of styrene, and particularly to a control agent for controlling the cell size of an extruded polystyrene foam when a low-boiling hydrocarbon is employed as a foaming agent.

It has been proposed heretofore to mix citric acid and sodium bicarbonate with a low boiling hydrocarbon and the molten homopolymers or copolymers of styrene in a screw extruder to form carbon dioxide, and to control the size of the cells ultimately produced in the foam prepared from the polymer by means of the carbon dioxide produced. However, the reaction between citric acid and sodium bicarbonate is very rapid under the conditions prevailing in a normal extruder, and the water vapor and carbon dioxide generated flow backward from the extruder into the resin hopper and interfere with the flow of resin from the hopper into the extruder.

Attempts have been made to reduce the rate of reaction between citric acid and sodium bicarbonate by coating the particles of at least one reactant with paraffin oil or similar oily materials, but these materials have been found unfavorably to affect the mechanical properties of the foam produced.

Citric acid, moreover, decomposes readily at the melting temperatures of styrene and of its copolymers mainly consisting of repeating styrene groups, that is, in the temperature range between 160° and 210° C. The citric acid, when fed to the extruder together with the resin, thus tends to form infusible deposits on the extruder screw, even when fed to the extruder together with a portion of the resin and the sodium bicarbonate, and when the foaming agent, such as pentane, is fed separately to the melting zone of the extruder.

The primary object of the invention is an improvement in the known extrusion of polystyrene and styrene copolymers containing minor amounts of butadiene and/or acrylonitrile, in which a low boiling hydrocarbon is used as a foaming agent and a mixture based on citric acid develops carbon dioxide and is used as a cell size control agent.

SUMMARY OF THE INVENTION

It has been found that sodium dihydrogen citrate, or monosodium citrate, is stable at the temperatures normally prevailing in an extruder prior to the melting of polystyrene, and thus also during the melting of styrene copolymers having similar melting ranges, and that it reacts extremely slowly with bicarbonates and carbonates at temperatures below 160° C., thus making monosodium citrate in mixture with an alkali metal or ammonium carbonate or bicarbonate a useful cell control agent in foam extrusion process employing low boiling hydrocarbons, and particularly n-pentane or n-butane, as foaming agents, and which may otherwise be conventional.

The preferred apparatus employed for carrying out the method of the invention is an extruder of the type disclosed in U.S. Patents Nos. 2,669,751, 3,060,512 and 3,121,130 in which provisions are made for feeding a low boiling hydrocarbon as a foaming agent to a melting zone of the extruder spacedly intermediate the feeding zone for the resin and the extrusion die or nozzle.

PREFERRED EMBODIMENTS OF THE INVENTION

The following examples further illustrate this invention, but it will be understood that the invention is not limited to the examples.

Example 1

100 parts (by weight) polystyrene, 0.37 part sodium bicarbonate, and 0.32 part of a mixture of anhydrous citric acid and anhydrous trisodium citrate in a weight ratio of 1:0.7 were fed to the hopper of an extruder in separate continuous streams. The resulting mixture was advanced by the rotating screw of the extruder from the feeding zone to the melting zone in which a temperature of 190° C. was maintained.

n-Pentane was fed to the melting zone at a rate of 4.0 parts per 100 parts of the polystyrene, and intimately worked into the melt. Upon leaving the melting zone, the mixture was cooled somewhat, and was ultimately discharged from the nozzle or die of the extruder into the ambient atmosphere at a nozzle temperature of 120° C.

The die was shaped to produce a polystyrene foam film having a thickness of 0.25 mm. The film had cells of very small size which gave the film a luster similar to that of mother of pearl. Its apparent specific gravity was 0.12, and its bursting strength 1.9 kg./cm.$^2$. It could readily be printed upon or embossed.

Example 2

100 parts (by weight) polystyrene, 0.18 part sodium bicarbonate and 0.16 part of a citric acid/sodium citrate mixture as in Example 1 were fed to the hopper of the extruder referred to above through separate feeders, and the mixture formed in the feeding zone of the extruder was advanced to the melting zone where a temperature of 180° C. was maintained. n-Butane was separately fed to the melting zone at a rate of 3.0 parts per 100 parts of polystyrene and intimately mixed with the melt which was then cooled until it reached a temperature of 110° C. at the die through which it was discharged from the extruder into the ambient atmosphere.

A sheet 1.5 mm. thick was thus obtained. It had an apparent specific gravity of 0.125 and a bursting strength of 3.5 kg./cm.$^2$. It was suitable, for example, for molding ice cream cups.

Theoretically, the ratio of anhydrous citric acid to anhydrous neutral sodium citrate, that is, trisodium citrate necessary for producing monosodium citrate in the mixture, should be 1.0:0.57, but the benefits of this invention are available if the mole ratio of 2:1 between the citric acid and the neutral or trisodium citrate is only approximately maintained. Good results have been obtained with 0.5 to 0.8 part of trisodium citrate by weight per part of citric acid. This mixture may safely be combined with an approximately equivalent amount of sodium bicarbonate to produce the desired amount of carbon dioxide at temperautres above 160° C. only.

While the potassium or ammonium bicarbonates are equally effective, they do not offer any advantages over the cheaper sodium salts, and the neutral carbonates of sodium, potassium, and ammonium, while operative, require twice the amount of citric acid and citrate for producing a desired amount of carbon dioxide. The other alkali metal carbonates and bicarbonates are even less economical to use and do not merit serious consideration although they can produce the desired effects.

The reaction between the monosodium citrate and the alkali metal and ammonium carbonates and bicarbonates does not proceed at a significant rate at temperatures below 160° C. It goes to completion at temperatures between 160° and 210° C. which are normally required in the melting zone of an extruder operating with polystyrene or the aforementioned styrene copolymers. The monosodium citrate of the invention may, therefore, also be employed with copolymers of styrene which can be fused into a melt in this temperature range.

The carbon dioxide and water generated by the reaction between the acid citrate and sodium bicarbonate are stirred and mixed with the resin by the screw of the extruder while they are advanced toward the melting zone to which the hydrocarbon foaming agent is separately fed. The mixture of resin, carbon dioxide, sodium citrate and hydrocarbon is then cooled until it is ready to be discharged to the atmosphere through the nozzle or die of the extruder at a temperature normally varying between 110° and 130° C.

While n-butane is the preferred foaming agent, propane and n-pentane have also been used heretofore, and may be employed in the method of this invention.

The corresponding ammonium and other alkali metal citrates may replace trisodium citrate in the method of the invention. Monoammonium citrate, obtained by mixing citric acid with triammonium citrate in a mole ratio of approximately 2:1, or a weight ratio of 1:0.5 to 1:0.6 decomposes sodium bicarbonate much more slowly than an equivalent amount of citric acid, and potassium monocitrate is even more closely similar to sodium monocitrate when used in the method of the invention. A mole ratio of 2:1 between citric acid and tripotassium citrate is achieved by mixing 1 part citric acid with 0.7 to 0.8 part of the tripotassium citrate, all weight ratios being based on the anhydrous forms of citric acid and its salts.

The weight ratio of low boiling hydrocarbon to the polystyrene or styrene copolymer resin may be varied between 1:100 and 6:100, and the ratio of the cell size controlling agent to the styrene polymer or copolymer may be between 0.2:100 and 1.0:100, the term "cell size controlling agent" covering the mixture of citric acid, citrate, and carbonate or bicarbonate referred to above.

It should be understood, therefore, that the foregoing examples relate only to preferred embodiments of the invention and that it is intended to cover all changes and modifications of the examples of the invention chosen herein for the purpose of the disclosure which do not constitute departures from the spirit and scope of the invention set forth in the appended claims.

What is claimed is:

1. In a method of producing a foamed thermoplastic synthetic resin in which a resin having a melting temperature in the range between 160° C. and 210° C. is mixed with a cell size controlling agent in a feeding zone of an extruder, the mixture is advanced to a melting zone of the extruder in which it is further mixed with a low boiling hydrocarbon at a temperature in said range until the resin is substantially molten and the melt is mixed with said hydrocarbon, the mixed melt is thereafter cooled to a temperature below said range and discharged from the extruder under pressure, the improvement in the use of the cell size controlling agent which comprises:

(a) mixing said resin with said cell size controlling agent at a ratio between 100:0.2 and 100:1, (1) said cell size controlling agent essentially consisting of citric acid and a neutral salt of said acid with an alkali metal or ammonium in a mole ratio of approximately 2:1 and of a bicarbonate or carbonate of an alkali metal or of ammonium, the amount of said carbonate or bicarbonate being approximately equivalent to the combined citric acid and neutral salt of said citric acid.

2. In a method as set forth in claim 1, said neutral salt of citric acid being trisodium citrate, and said bicarbonate or carbonate of an alkali metal or of ammonium being sodium bicarbonate.

3. In a method as set forth in claim 1, said resin being a polymer mainly consisting of repeating styrene groups.

4. In a method as set forth in claim 1, said resin being polystyrene.

5. In a method as set forth in claim 1, said temperature below said range being between 110° C. and 130° C.

References Cited

UNITED STATES PATENTS 2,941,964  6/1960  Houston _____ 260—2.5
3,293,196  12/1966  Nakamori _____ 260—2.5

SAMUEL H. BLECH, Primary Examiner

MORTON FOELAK, Assistant Examiner

U.S. Cl. X.R.

260—41; 264—53, 54